United States Patent
Tarancon, III

(10) Patent No.: US 8,128,902 B2
(45) Date of Patent: Mar. 6, 2012

(54) METHOD FOR THE SYNTHESIS OF ANHYDROUS HYDROGEN HALIDE AND ANHYDROUS CARBON DIOXIDE

(75) Inventor: Gregorio Tarancon, III, Fort Myers, FL (US)

(73) Assignee: Midwest Refrigerants, LLC, La Jolla, CA (US)

(*) Notice: Subject to any disclaimer, the term of this patent is extended or adjusted under 35 U.S.C. 154(b) by 0 days.

(21) Appl. No.: 13/100,951

(22) Filed: May 4, 2011

(65) Prior Publication Data
US 2011/0212017 A1    Sep. 1, 2011

Related U.S. Application Data

(60) Provisional application No. 61/474,659, filed on Apr. 12, 2011.

(51) Int. Cl.
 C01B 7/01    (2006.01)
 C01B 7/19    (2006.01)
 C01B 31/20   (2006.01)
 C01B 3/12    (2006.01)
 C01B 3/16    (2006.01)

(52) U.S. Cl. .............. 423/483; 423/418.2; 423/437.2; 423/486; 423/655; 423/656

(58) Field of Classification Search .......... 423/483, 423/486, 437.2, 418.2, 655, 656
See application file for complete search history.

(56) References Cited

U.S. PATENT DOCUMENTS

| | | | |
|---|---|---|---|
| 1,420,209 A * | 6/1922 | Paulus | 423/418.2 |
| 3,220,798 A * | 11/1965 | Cull et al. | 423/486 |
| 3,445,292 A | 5/1969 | Childs | |
| 3,760,565 A | 9/1973 | Fish | |
| 3,845,191 A | 10/1974 | Bruce, Jr. | |
| 4,059,675 A | 11/1977 | Yang et al. | |
| 4,229,416 A | 10/1980 | Donaldson et al. | |
| 4,282,339 A | 8/1981 | Donaldson et al. | |
| 4,423,024 A | 12/1983 | Wolford | |
| 4,435,379 A | 3/1984 | Olson et al. | |
| 4,447,262 A | 5/1984 | Gay et al. | |
| 4,631,183 A | 12/1986 | Lalancette | |
| 4,654,203 A | 3/1987 | Maurer | |
| 4,666,696 A | 5/1987 | Shultz | |

(Continued)

FOREIGN PATENT DOCUMENTS
EP    439738 A1    8/1991

(Continued)

OTHER PUBLICATIONS

Montreal Protocol on Substances That Deplete the Ozone Layer Report of the Technology and Economic Assessment Panel, Apr. 2002, vol. 3B, Report of the Task Force on Destruction Technologies, paragraph 3.2 Incineration Technologies, sub paragraphs 3.2.1 Reactor Cracking and 3.2.2 Gaseous/Fume Oxidation; Table 3-1: Emissions from Reactor Cracking Process and Table 3-2: Emissions from Gaseous/Fume Oxidation Process. http://ozone.unep.org/teap/Reports/Other_Task_Force/TEAP02V3b.pdf.

(Continued)

Primary Examiner — Wayne Langel
(74) Attorney, Agent, or Firm — McKenna Long & Aldridge LLP

(57) ABSTRACT

A method for the synthesis of anhydrous hydrogen halide fluids from organic halide fluids, such as perfluorocarbon fluids and refrigerant fluids, and anhydrous carbon dioxide for the environmentally safe disposition thereof.

19 Claims, 2 Drawing Sheets

U.S. PATENT DOCUMENTS

| | | | |
|---|---|---|---|
| 4,906,796 A | 3/1990 | Yates | |
| 4,935,212 A | 6/1990 | Jacob | |
| 4,950,309 A | 8/1990 | Schulz | |
| 5,087,778 A | 2/1992 | Yates | |
| 5,160,499 A | 11/1992 | Edwards | |
| 5,236,671 A | 8/1993 | Grotz | |
| 5,245,112 A | 9/1993 | Hoshimoto | |
| 5,260,496 A | 11/1993 | Meinert et al. | |
| 5,288,930 A | 2/1994 | Shields et al. | |
| 5,352,428 A | 10/1994 | Bhakta et al. | |
| 5,416,247 A | 5/1995 | Webster | |
| 5,427,760 A | 6/1995 | Grotz | |
| 5,497,627 A | 3/1996 | Heyduk et al. | |
| 5,547,653 A * | 8/1996 | Webster et al. | 423/445 R |
| 5,585,529 A | 12/1996 | Corbin et al. | |
| 5,628,894 A | 5/1997 | Tarancon | |
| 5,653,949 A | 8/1997 | Chen | |
| 5,695,732 A * | 12/1997 | Sparks et al. | 423/418.2 |
| 5,759,504 A | 6/1998 | Kanno et al. | |
| 5,779,998 A | 7/1998 | Tom | |
| 5,830,325 A | 11/1998 | Mahler et al. | |
| 5,877,391 A | 3/1999 | Kanno | |
| 5,965,786 A | 10/1999 | Rostaing et al. | |
| 5,977,427 A | 11/1999 | Tamata et al. | |
| 6,047,560 A | 4/2000 | Nishimura et al. | |
| 6,069,291 A * | 5/2000 | Rossin et al. | 588/316 |
| 6,077,482 A | 6/2000 | Kanno et al. | |
| 6,239,064 B1 | 5/2001 | Nguyen | |
| 6,294,709 B1 | 9/2001 | Izumikawa et al. | |
| 6,350,614 B1 | 2/2002 | Heath et al. | |
| 6,509,511 B1 | 1/2003 | Rossin | |
| 6,602,480 B1 | 8/2003 | Mori | |
| 6,605,750 B1 | 8/2003 | Bessho et al. | |
| 6,622,523 B2 | 9/2003 | Ludwig et al. | |
| 6,652,830 B2 * | 11/2003 | Wang et al. | 423/656 |
| 6,673,326 B1 | 1/2004 | Rossin | |
| 6,764,666 B2 | 7/2004 | Mori | |
| 6,921,519 B2 | 7/2005 | Draper | |
| 7,294,315 B1 | 11/2007 | Kanno | |
| 7,435,394 B2 | 10/2008 | Kanno | |
| 7,476,374 B2 | 1/2009 | Weckhuysen | |
| 2001/0001652 A1 | 5/2001 | Kanno et al. | |
| 2002/0074946 A1 | 6/2002 | Ikeda et al. | |
| 2002/0111526 A1 | 8/2002 | Seeley | |
| 2004/0042948 A1 | 3/2004 | Kanno et al. | |
| 2004/0047784 A1 | 3/2004 | Kano et al. | |
| 2004/0191146 A1 | 9/2004 | Shinohara | |
| 2005/0271568 A1 | 12/2005 | Mori et al. | |
| 2006/0024226 A1 | 2/2006 | Park et al. | |
| 2007/0049781 A1 | 3/2007 | Brown et al. | |
| 2007/0274888 A1 | 11/2007 | Hertzler et al. | |
| 2010/0286463 A1 | 11/2010 | Tarancon | |

FOREIGN PATENT DOCUMENTS

| | | |
|---|---|---|
| EP | 0503771 A1 | 9/1992 |
| EP | 0 748 649 A1 | 12/1996 |
| EP | 0885648 A1 | 12/1998 |
| FR | 2724806 A1 | 3/1996 |
| GB | 2 295 101 A | 5/1996 |
| JP | 2004105864 A | 4/2004 |
| JP | 2005040674 A | 2/2005 |
| WO | WO 94/19301 | 9/1994 |
| WO | WO 99/24358 | 5/1999 |
| WO | WO 99/28019 | 6/1999 |
| WO | WO 01/21304 A1 | 3/2001 |
| WO | WO 2004/052513 A1 | 6/2004 |
| WO | WO 2007/099081 A1 | 9/2007 |

OTHER PUBLICATIONS

*University of Pittsburg* $H_2$ Production in Palladium & Palladium-Copper Membrane Reactors At 1173K in the Presence of $H_2S$, Author: Osemwengie Uyi Iyoha, prepared2007.
*Pacific Northwest Laboratory (PNL)* Destruction of Chlorofluorocarbons and Halons, PNL-SA-26159, Jun. 1995, pp. 1-7, Authors: J. M. Matchett, K. B. Miller and C. W. Purcell.
*United States Environmental Protection Agency* Mechanisms of Formation of Dioxin-Like Compounds during Combustion of Organic Materials http://www.epa.gov/ncea/pdfs/dioxin/nas-review/pdfs/part1_vol1/dioxin_pl1_vol1_ch02_dec2003.pdf.
*United Nations Environment Programme (UNEP)* Dioxins and Furans in the Chemical Industry, pp. 1-11, Author: Dr. Arseen Seys http://www.chem.unep.ch/POPs/POPs_inc/proceedings/abu-dhabl/SEYS2.html.
*Environment Canada* Technical Document for Batch Waste Incineration, Apr. 2010, paragraph 2.1.3, p. 7, http://www.ec.gc.ca/gdd-mw/default.asp?lang=En&n=8A09EA04-1.
*Ecletica Quimica* Evaluation of the Dioxin and Furan Formation Thermodynamics in Combustion processes of Urban Solid Waste, vol. 32, No. 1, 2007, pp. 1-7, Author: J. C. Moreno-Pirajan et al., Instituto de Quimica/UNESP, SP Brazil, http://www.scielo.br/scielo.php?script=sci_arttext&pid=S0100-45702007000100002&ing=en&nrm=iso&ting=en.
*Euro Chlor* Dioxins, Apr. 2002, p. 1, http://www.eurochlor.org/upload/documents/document57.pdf.
*Office of Fluorocarbons Control Policy, Global Environment Bureau, Ministry of the Environment, Government of Japan* Guidelines on the Destruction of CFCs in Japan, Updated in Mar. 1999 www.env.go.jp/en/earth/ozone/gl199903.pdf.
*United States Environmental Protection Agency* Technologies for CFC/Halon Destruction, EPA/600/S7-89/01, Dec. 1, 1989, pp. 1-4, Authors: J. C. Dickerman, T. E. Emmel, G. E. Harris and K. E. Hummel, http://nepis.epa.gov/Exe/ZyPURL.cgi?Dockey=30003UR2.txt.
*ESPI Metals* High Purity Hastelloy, p. 1 Overview and p. 4 Technical Data Sheets. http://www.espimetals.com/index.php.online-catalog/378-hastelloy.
*Aviation Metals, INC.* Introduction to Inconel, pp. 1-4 Specifications. http://www.aviationmetals.net/inconel.php.
Maeno et al. "Decomposition experiment of hydro-fluorcarbon gas by pulsed TEA CO 2 laser", Proceedings of SPIE—The International Society for Optical Engineering, V 5777, n Part II, p. 1034-1039, 2005.
Bessho et al. "Development of CFCs decomposition system using microwave plasma", Technical Review—Mitsubishi Heavy Industries, v 37, n 3, p. 83-87, Oct. 2000.
Rice et al. "Selective catalytic activity toward hydrofluorocarbon refrigerants in mixed oxides of manganese and copper", Applied Catalysis B: Environmental, V 24, n2, p. 107-120, Jan. 17, 2000.
J.W. Magee. "Halogenated hydrocarbons and their mixtures: A decade of process in calorimetry" National Institute of Standards and Technology, Physical and Chemical Properties Division, NISTIR-6620, 30p, Mar. 2002.
Nagata et al. "Catalytic oxidative decomposition of chlorofluorocarbons (CFCs) in the presence of hydrocarbons", Applied Catalysis B: Environmental 5 (1994) pp. 23-31, Elsevier Science B.V.
Environmental Science and Technology Efficient Destruction of CF4 through in Situ Generation of Alkali Metals from Heated Alkali Halide Reducing Mixtures, vol. 36, No. 6, 2002, pp. 1367-1371, Authors: Myung Churl Lee and Wonyong Chol, School of Environmental Science and Engineering, Pohang University of Science and Technology, Pohang 790-784, Korea.
Environmental Science and Technology Carbon Atom-Initiated Degradation of Carbon Tetrachloride in the Presence of Molecular Oxygen: A Product and Mechanistic Study, vol. 32, No. 20, 1998, pp. 3200-3206, Authors: Gayle Nicoll and Joseph S. Francisco, Department of Chemistry and Department of Earth & Atmospheric Sciences, Purdue University, West Lafayette, Indiana 47907-1393.
Environmental Science and Technology Heterogeneous Degradation of Carbon Tetrachloride: Breaking the Carbon-Chloride Bond with Activated Carbon Surfaces, vol. 33, No. 22, 1999, pp. 4102-4106, Authors: Gayle Nicoll and Joseph S. Francisco, Department of Chemistry and Department of Earth & Atmospheric Sciences, Purdue University, West Lafayette, Indiana 47907-1393.
USPTO Notice of Allowance dated Sep. 9, 2011.

* cited by examiner

US 8,128,902 B2

METHOD FOR THE SYNTHESIS OF ANHYDROUS HYDROGEN HALIDE AND ANHYDROUS CARBON DIOXIDE

CROSS REFERENCE TO RELATED APPLICATION

This application claims the benefit of U.S. Provisional Patent Application No. 61/474,659, filed on Apr. 12, 2011, which is hereby incorporated by reference as if fully set forth herein.

FIELD OF THE INVENTION

This invention relates to a method for the synthesis of anhydrous hydrogen halide and carbon dioxide. In thermo-catalytic reactor A, carbon dioxide is synthesized from carbon monoxide and water. In thermo-catalytic reactor B, hydrogen halide fluids are synthesized from organic halide fluids, anhydrous hydrogen and anhydrous carbon dioxide.

BACKGROUND OF THE INVENTION

The organic halide family is very extensive. This invention is concerned with the family of refrigerant fluids and perfluoro fluids. The chemical synthesis of a significant number of organic halide fluids have been accomplished during the last 80 years, including the majority of refrigerant fluids such as chlorofluorocarbons (hereinafter "CFCs"), hydrochlorofluorocarbons ("HCFCs"), fluorocarbons ("FCs") hydrofluorocarbons ("HFCs") and hydrofluoroalkenes ("HFOs").

It has been established that some fluids, particularly compounds used as refrigerants, have contributed to the depletion of ozone in the atmosphere and global warming International action has been taken to phase out the use of these refrigerants and like compounds. Currently, the scientific community is concerned with protecting the environment, particularly with respect to any chemical contamination, including the release of carbon dioxide to the atmosphere.

Current methods for the treatment and/or decomposition of organic halide fluids, such as refrigerants, can include the use of extremely high temperatures. For example, certain methods for the decomposition of refrigerants include heating the compounds to a temperature of about 1300° C. to 20000° C. under reducing conditions. Thus, there exists a need for methods for the treatment of organic halide fluids under less severe conditions; i.e. temperatures less than 1300° C.

SUMMARY OF THE INVENTION

Accordingly, the present invention is directed to a method for the synthesis of anhydrous hydrogen halide and anhydrous carbon dioxide that substantially obviates one or more of the problems due to limitations and disadvantages of the related art.

Exemplary embodiments provide a new method for the synthesis of anhydrous hydrogen halide and carbon dioxide. In thermo-catalytic reactor A, carbon dioxide may be synthesized from carbon monoxide and water. In thermo-catalytic reactor B, hydrogen halide fluids may be synthesized from organic halide fluids, hydrogen and anhydrous carbon dioxide.

In an exemplary embodiment, dual reactors A and B of unit 1, wherein a battery of one or more dual reactors a thermo-catalytic reaction takes place in reactor A of the first heat sink vessel, a thermo-catalytic reaction takes place in reactor B of the second heat sink vessel and the third heat sink vessel provides the means for balancing the heat in the first and second heat sink vessels.

In one aspect, the embodiments provide a method for the thermo-catalytic synthesis of anhydrous hydrogen halide fluids and anhydrous carbon dioxide. In thermo-catalytic reactor A, carbon dioxide and hydrogen are synthesized from carbon monoxide and water. In thermo-catalytic reactor B, hydrogen halide fluids are synthesized from organic halide fluids, hydrogen and anhydrous carbon dioxide.

In another aspect, the embodiments provide a method with dual reactors A and B, wherein reactor A, the reactants are carbon monoxide and water, which forms carbon dioxide and hydrogen with a low energy exothermic reaction in a pressure range from 1 atm to 30 atm and in a temperature range of 300° C. to 900° C. In reactor B the reactants are organic halide fluids, anhydrous hydrogen and anhydrous carbon dioxide, which forms hydrogen halide fluids and carbon monoxide, in a pressure range from 1 atm to 30 atm and in a temperature range of 600° C. to 900° C.

In another aspect, the embodiments provide a method having a hydrogen diffuser where the hydrogen atom output is at least equal to the number of halide atoms from the organic halide fluid.

In another aspect, the embodiments provide a method having a mass control device to regulate the flow of carbon dioxide molecules to be at least equal to the number of carbon atoms of the other reactants, forming the anhydrous hydrogen halide fluids and carbon monoxide.

In another aspect, the embodiments provide a method for the thermal-catalytic decomposition of organic halide fluids such as refrigerant fluids and perfluorocarbon fluids.

In another aspect, the embodiments provide a method with a thermo-catalytic reactor for the conversion of carbon monoxide and water to hydrogen and carbon dioxide.

In another aspect, the embodiments provide a method with a thermo-catalytic reactor for the conversion of organic halide to anhydrous hydrogen halide and carbon monoxide.

In another aspect, the embodiments provide a method with a thermo-catalytic reaction (similar to a water-gas shift reaction) utilizing a catalyst for the conversion of carbon monoxide and water to hydrogen and carbon dioxide.

In another aspect, the embodiments provide a method with a thermo-catalytic reaction utilizing a catalyst for the conversion of organic halide to anhydrous hydrogen halide and carbon monoxide.

In another aspect, the embodiments provide a method to arrange the dual reactors A and B wherein energy input is not required to run the reaction.

In another aspect, the embodiments provide a method to control the balance between the halide atoms of the reactants and the hydrogen atoms to form only anhydrous hydrogen halide fluids.

In another aspect, the embodiments provide a method to control the carbon dioxide in reactor B that prevents any formation of carbon (soot) and to form only carbon monoxide.

In another aspect, the embodiments provide a method with dual reactors. In reactor A there are no organic halides, organic chloride compounds or molecular chlorine present and in reactor B there is no molecular oxygen present, thus preventing the formation of dioxins and furans.

In another aspect, the embodiments provide a method for the synthesis of hydrogen halide and carbon monoxide from the conversion of hydrogen, carbon dioxide and organic halides, such as CFCs, HCFCs, FCs and HFCs, as the reactant fluids in the presence of a catalyst in the reaction zone of reactor B.

In another aspect, the embodiments provide a method for any hydrogen, carbon monoxide and/or carbon dioxide exiting from the hydrogen diffuser to be recycled to the inlet of reactor A.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for the synthesis of anhydrous hydrogen halide and carbon dioxide comprising: reacting one or more organic halides with anhydrous hydrogen and anhydrous carbon dioxide to produce anhydrous carbon monoxide and one or more anhydrous hydrogen halides; and reacting the carbon monoxide with water to produce hydrogen and carbon dioxide.

In another aspect of the present invention, a method for the treatment and/or decomposition of organic halide fluids without harmful environmental emissions comprising: reacting in a reactor B one or more organic halides, anhydrous hydrogen, and anhydrous carbon dioxide to produce carbon monoxide and one or more anhydrous hydrogen halides; collecting at least part of the anhydrous hydrogen halides; flowing the carbon monoxide to a reactor A; reacting the carbon monoxide in reactor A with water to produce hydrogen and carbon dioxide; removing the water from the hydrogen and carbon dioxide to produce anhydrous hydrogen and anhydrous carbon dioxide; recycling the anhydrous hydrogen and anhydrous carbon dioxide to reactor B.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Although the following detailed description contains many specific details for purposes of illustration, it is understood that one of ordinary skill in the art will appreciate that many examples, variations and alterations to the following details are within the scope and spirit of the invention. Accordingly, the exemplary embodiments of the invention described herein are set forth without any loss of generality to, and without imposing limitations thereon, the claimed process invention.

Organic halide compounds and/or refrigerants fluids can include CFCs, HCFCs, FCs, HFCs and HFOs, that include at least of one fluid compound, such as refrigerant fluids including, but not limited to: R10 (carbontetrachloride), R11 (trichlorofluoromethane), R12 (dichlorodifluoromethane), R13 (chlorotrifluoromethane), R14 (tetrafluoromethane), R21 (dichlorofluoromethane), R22 (chlorodifluoromethane), R23 (trifluoromethane), R30 (methylene chloride), R31 (chlorofluoromethane), R32 (dichloromethane), R40 (chloromethane), R41 (fluoromethane), R152a (difluoroethane), R110 (chloroethane), R112 (chlorodifluoroethane), R113 (trichlorotrifluoroethane), R114 (dichlorotetrafluoroethane), R115 (chloropentafluoroethane), R116 (hexafluoroethane), R123 (dichlorotrifluoroethane), R124 (chlorotetrafluoroethane), R125 (pentafluoroethane), R134a (tetrafluoroethane), R1234YF (2,3,3,3-Tetrafluoropropene), R1234ZE (1,3,3,3-Tetrafluoropropene), R1243ZF (1,1,1-Tetrafluoropropene), R141b (dichlorofluoroethane), R142b (chlorodifluoroethane), R143a (trifluoroethane), and like compounds. Similarly, brominated refrigerants, such as R12B (bromochlorodifluoromethane) and R13B (bromotrifluoromethane), and other related compounds having one or two carbon atoms and at least one bromine atom, can be treated according to the methods described herein. As used herein a fluid is defined as any substance, (liquid, or gas) that has a low resistance to flow and that tends to assume the shape of its container. As used herein, organic halide refers to molecules that include both carbon and a halogen, preferably including between 1, 2, 3 and 4 carbon atoms, and at least one halogen atom per molecule. In certain embodiments, the organic halide and/or refrigerant include at least one carbon atom and at least one fluorine atom.

One aspect of the present invention is a dual reactor unit wherein two thermo-catalytic reactions may take place for the synthesis of anhydrous hydrogen halide and carbon dioxide. Both reactions may take place in a plasma free environment. In an exemplary embodiment, the dual reactor unit may include reactor A and reactor B. Both reactors A and B may be thermo-catalytic reactor tubes. In reactor A, the thermo-catalytic reaction of carbon monoxide and water forms carbon dioxide and hydrogen. In reactor B, the thermo-catalytic reaction of the organic halide, hydrogen and carbon dioxide forms anhydrous hydrogen halide products and carbon monoxide recycle fluid.

Figure 1:
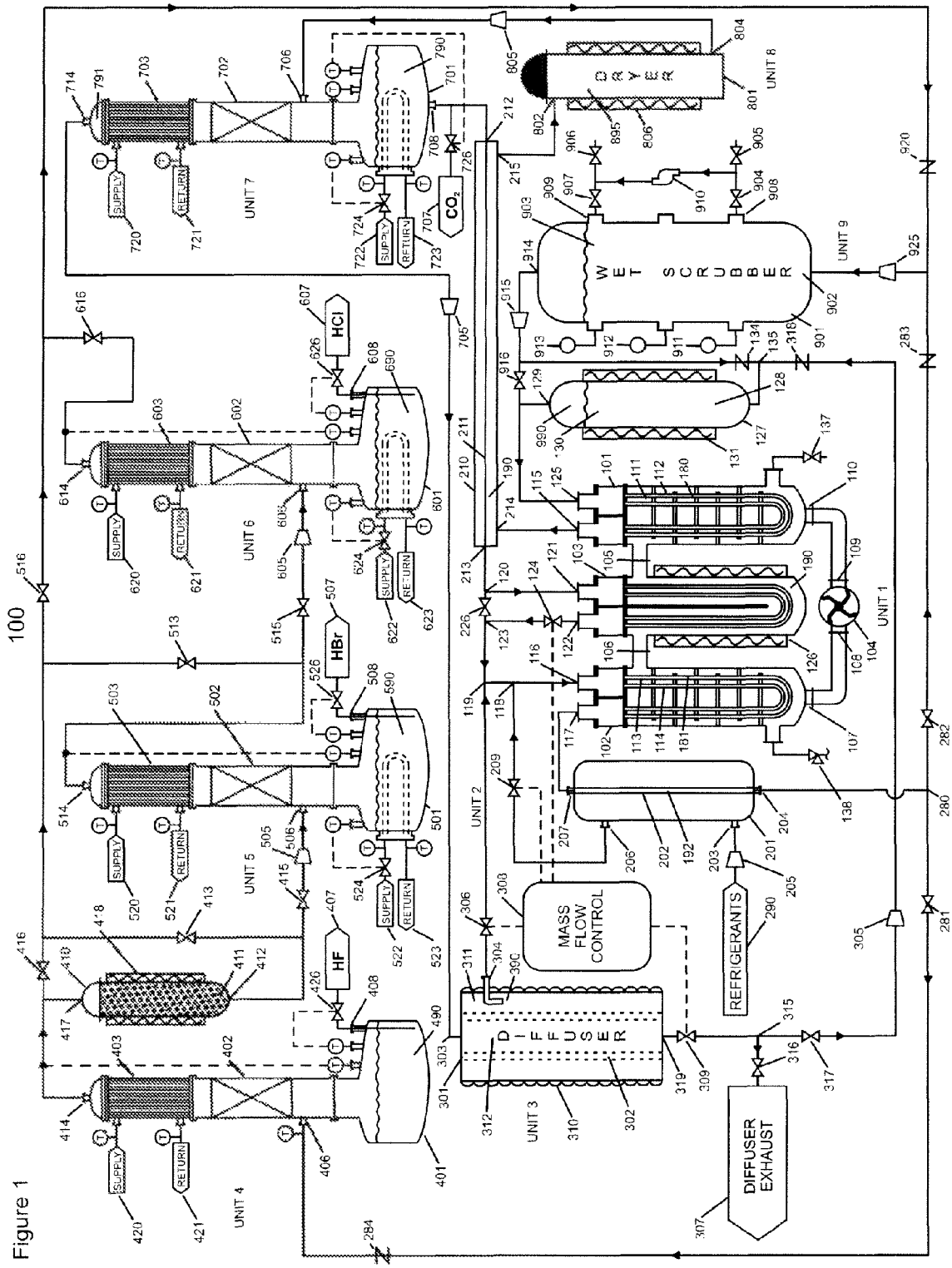
FIG. 1 is one embodiment of the flow diagram arrangement of the apparatus 100 utilized by the present invention.

FIG. 1 is an illustration of an exemplary embodiment of an apparatus or system 100. This exemplary embodiment includes a dual reactor unit 1, heat exchangers unit 2, hydrogen diffuser unit 3, a series of purified collectors that may include anhydrous hydrogen fluoride purifier/collector unit 4, hydrogen bromide purifier/collector unit 5, hydrogen chloride purifier/collector unit 6, a separate purifier/collector unit such as a carbon dioxide purifier/collector unit 7, dryer unit 8 and hydrogen halide neutralization scrubber unit 9. The nine units are represented with a single digit. All accessories and/or components of each unit are represented by two digits after the digit representing the unit; i.e. the pipe connection of the gas inlet in scrubber unit 9 is represented by the number 902.

By following this numbering procedure, all the elements of a unit can be described as follows. Heat transfer fluid 190 in reactor unit 1 is brought to the operating temperature via the external heating means 126 of heat sink vessel 103. The heat transfer fluid 190 is circulated by means of bi-directional flow circulator 104 from heat sink vessel 103 via pipe connection 105 to heat sink vessel 101. From heat sink vessel 101 heat transfer fluid 190 may flow via pipe connection 110 and 109 to bi-directional flow circulator 104 continuing via pipe connections 108 and 107 to heat sink vessel 102. The heat transfer fluid 190 may flow from heat sink vessel 102, via pipe connection 106, back to heat sink vessel 103. A means to heat balance heat sink vessel 103 is via inlet pipe connection 120 and 121 and outlet pipe connections 122, 123 and flow control valve 124. Dual reactor unit 1 can be filled with or drained of heat transfer fluid 190 via valve 137 and may be pressure protected by safety relief valve 138.

In our exemplary embodiment, once an operating temperature is reached a flow of carbon monoxide and water stream 990 enters reactor tube 112 in heat sink vessel 101 via pipe connection 125. The thermo-catalytic reaction of the carbon monoxide and water stream 990 takes place in reaction zone 111 assisted by catalyst 180. Any excess heat of reaction passes through the diathermal wall of reactor tube 112 and may be absorbed by heat transfer fluid 190. The reaction forms hydrogen and carbon dioxide stream 191, which may exit reactor tube 112 via pipe connection 115.

The hydrogen, un-reacted carbon monoxide and carbon dioxide stream 191 may enter the tube-in-tube heat exchanger 210 via pipe connection 214 and exits via pipe connection 215 and flows to the hydrogen, un-reacted carbon monoxide and carbon dioxide dryer unit 8 via pipe connection 802.

Dryer unit 8 may include vessel 801 with external heating means 806 for the thermo-regeneration of the drying agent 895. Hydrogen, un-reacted carbon monoxide and carbon dioxide stream 191 exits dryer 801 as anhydrous hydrogen, anhydrous un-reacted carbon monoxide and anhydrous carbon dioxide stream 191 via pipe connection 804, flowing to gas compressor 805.

Exiting gas compressor 805, the hydrogen, un-reacted carbon monoxide and carbon dioxide stream 191 may then enter a carbon dioxide purifier/collector unit 7 via pipe connection 706. The carbon dioxide purifier/collector unit 7 may include column 702, reflux condenser 703 with cooling mean inlet 720 and outlet 721 and collector 701 with heating means inlet 722 and outlet 723, where the liquid carbon dioxide 790 can be collected. The liquid carbon dioxide 790 in collector 701 can be drained via pipe connection 708 and valve 726 to container connection 707. After purification and collection of the carbon dioxide stream 790, the carbon dioxide stream 790 exits purifier/collector unit 701 via pipe connection 708.

In one exemplary embodiment, the carbon dioxide stream 790 may then be flowed to enter the tube-in-tube heat exchanger 210 via pipe connection 212, flowing through inner tube 211. The wall of the inner tube 211 is a diathermal wall and transfers heat from the outside of the inner tube 211 to the inside of the inner tube 211, therefore passing heat to the carbon dioxide stream 790 in the inner tube 211. Carbon dioxide stream 790 exits via pipe connection 213 and flows via pipe connections 120, 121, 122, 123, 119, 118 and 116 and flow control valve 124 to reactor tube 114. In line valve 226 may be used only as a servicing valve.

In one embodiment, the hydrogen, un-reacted carbon monoxide and traces of carbon dioxide stream 791 can exit from the top of purifier/collector unit 7 via pipe connection 714 and flows to gas compressor 705. The stream 791 exits gas compressor 705 and flows to hydrogen diffuser 301 via pipe connection 303.

Hydrogen diffuser 301 may include an external heating means 310, hydrogen intake chamber 312 with palladium wall 302 and hydrogen collector 311. The hydrogen stream 390 may exit the hydrogen collector of hydrogen diffuser 301 via pipe connection 304. The purified hydrogen stream 390 flow may be regulated by mass flow controller 308 operating flow control valve 306 and 309. In one embodiment, the purified hydrogen stream 390 flows via pipe connections 119, 118 and 116 to reactor tube 114. Any remaining hydrogen, carbon monoxide and carbon dioxide can exit hydrogen diffuser 301 and may be recycled via pipe connection 319 and 315, with valves 316 closed and 317 open, through gas compressor 305, check valve 318, pipe connection 135 and 128 in humidifier vessel 127 with the wet gas flowing back to reactor tube 112 via pipe connection 129 and 125. Optionally, when the hydrogen diffuser is in the regeneration mode, any remaining hydrogen, carbon monoxide and carbon dioxide may exit hydrogen diffuser 301 via pipe connections 319 and 315, valve 316, with valve 317 closed, and diffuser exhaust 307 to atmosphere. The mass controller 308 also operates flow control valve 124 to regulate the flow of carbon dioxide stream 790 and operates flow control valve 209 to regulate the flow of organic halide 290.

In one embodiment, the flow of the organic halide fluid stream 290 may be flowed through a tube-in-tube heat exchanger 201 from its connected source, to gas compressor 205 and pipe connection 203, passing through heat exchanger 201 and exiting via pipe connection 206, flowing via flow control valve 209 and pipe connections 118 and 116 to reactor tube 114.

The hydrogen stream 390, carbon dioxide stream 790 and organic halide fluid stream 290 come together, via pipe connection 116, and flow into reactor tube 114. The thermo-catalytic reaction of the carbon dioxide, hydrogen and organic halide fluid may take place in reaction zone 113, may be assisted by catalyst 181, forming anhydrous hydrogen halide and anhydrous carbon monoxide stream 192. The flow of hydrogen halide and carbon monoxide stream 192 exits the reaction tube 114 via pipe connection 117 and pipe connection 207, entering inner tube 202 of tube-in-tube heat exchanger 201.

The wall of the inner tube 202 may be a diathermal wall and may transfer heat from the inside of the inner tube 202 to the outside of the inner tube 202, therefore passing heat to the organic halide fluid stream 290 in the outer tube 201. The hydrogen halide and carbon monoxide stream 192 exits tube-in-tube heat exchanger 201 via pipe connections 204 and 280. The method of operation at this point may have at least two modes: (1) The mode of recovery of the hydrogen halide products (anhydrous hydrogen fluoride and/or anhydrous hydrogen bromide and/or anhydrous hydrogen chloride) may be by opening valve 281, closing valve 282, flowing through check valve 284 and entering the hydrogen fluoride purifier/collector unit 4 via pipe connection 406. (2) The mode of neutralizing the hydrogen halide products (anhydrous hydrogen fluoride and/or anhydrous hydrogen bromide and/or anhydrous hydrogen chloride) may be by opening valve 282, closing valve 281, flowing through check valve 283, to gas compressor 925 and entering scrubber vessel 901 via pipe connection 902, wherein the hydrogen halides are neutralized and the carbon monoxide is recycled to heat sink vessel 101.

The anhydrous hydrogen fluoride purifier/collector unit 4 may include column 402, reflux condenser 403 with cooling means inlet 420 and outlet 421 and outlet 421, collector 401 where the liquid hydrogen fluoride 490 can be collected and flow control valve 426. The liquid hydrogen fluoride 490 in collector 401 can be drained via pipe connection/dip tube 408 and valve 426 to container connection 407. The hydrogen fluoride 490 present may be removed from the hydrogen halide and carbon monoxide stream 192 at this point. In the event hydrogen fluoride 490 is the only hydrogen halide present in the hydrogen halide and carbon monoxide stream 192, the carbon monoxide stream 491 and any remaining hydrogen fluoride 490 may exit the hydrogen fluoride purifier/collector unit 4 via pipe connection 414, flowing through valve 416 and 516, (bypassing hydrogen bromide purifier/collector unit 5 and hydrogen chloride purifier/collector unit 6 by closing valves 413, 513 and 616) to neutralizing scrubber unit 9 via check valve 920 and pipe connection 902.

In the event hydrogen bromide and/or hydrogen chloride are present in hydrogen halide and carbon monoxide stream 192, the hydrogen halide and carbon monoxide stream 192, along with any remaining hydrogen fluoride 490, may exit hydrogen fluoride purifier/collector unit 4 via pipe connection 414 and enters hydrogen fluoride removal trap 410 via pipe connection 417, simultaneously closing valves 413 and 416 and opening valve 415.

Any remaining hydrogen fluoride 490 is absorbed by the sodium fluoride 411 in hydrogen fluoride removal trap 410. Hydrogen fluoride removal trap 410 has an external heating means 418 which is used, when required, to desorb the trapped hydrogen fluoride 490 and flow the desorbed hydrogen fluoride 490 via pipe connection 412 (by simultaneously opening valve 413 and closing valves 415, 416, 513 and 616) to neutralizing scrubber unit 9 via check valve 920 and pipe connection 902.

In the event there is hydrogen bromide and/or hydrogen chloride present in hydrogen halide and carbon monoxide stream 192 they may be removed using additional collectors. In such an embodiment, the hydrogen fluoride removal trap 410 may allow the hydrogen bromide and/or hydrogen chloride in hydrogen halide and carbon monoxide stream 192 to flow through valve 415 and gas compressor 505 to hydrogen bromide purifier/collector unit 5 via pipe connection 506. The anhydrous hydrogen bromide purifier/collector unit 5 consists of column 502, reflux condenser 503 with cooling means inlet 520 and outlet 521 and collector 501 with heating means inlet 522, flow control valve 524 and outlet 523, where the liquid hydrogen bromide 590 can be collected. The liquid hydrogen bromide 590 in collector 501 can be drained via pipe connection 508 and valve 526 to container connection 507. The hydrogen bromide 590 present will be removed from the hydrogen halide and carbon monoxide stream 192 at this point. In the event hydrogen bromide 590 is the only hydrogen halide still present in the hydrogen halide and carbon monoxide stream 192, the hydrogen halide and carbon monoxide stream 192, with any remaining hydrogen bromide 590, exits the hydrogen bromide purifier/collector unit 5 via pipe connection 514, flowing through valves 513 and 516, (bypassing hydrogen chloride purifier/collector unit 6 by closing valves 515 and 616) to neutralizing scrubber unit 9 via check valve 920 and pipe connection 902.

If hydrogen chloride is present in the hydrogen halide and carbon monoxide stream 192 exiting from hydrogen bromide purifier/collector unit 5 via pipe connection 514, valve 513 may be closed with the flow through valve 515, gas compressor 605 and pipe connection 606. The anhydrous hydrogen chloride purifier/collector unit 6 consists of column 602, reflux condenser 603 with cooling means inlet 620 and outlet 621 and collector 601 with heating means inlet 622, flow control valve 624 and outlet 623, where the liquid hydrogen chloride 690 can be collected. The liquid hydrogen chloride 690 in collector 601 can be drained via pipe connection 608 and valve 626 to container connection 607. The hydrogen chloride 690 will be removed from the hydrogen halide and carbon monoxide stream 192 at this point. The remaining hydrogen halide and carbon monoxide stream 192 exits the hydrogen chloride purifier/collector unit 6 via pipe connection 614, flowing through valve 616, to neutralizing scrubber unit 9 via check valve 920 and pipe connection 902.

Neutralizing scrubber unit 9 may include vessel 901, pipe connections 902, 908, 909 and 914, caustic solution 903, H pattern valves 904, 905, 906 and 907, pump 910 for circulation, filling, and draining caustic solution 903 in vessel 901, ph gauge 911, temperature gauge 912, pressure gauge 913, gas compressor 915, and valve 916. The carbon monoxide stream 491 and any remaining hydrogen halide fluids enters neutralizing scrubber unit 9 via pipe connection 902 wherein the hydrogen halide fluids present are neutralized by caustic solution 903 circulating in vessel 901 by pump 910. The ph level of caustic solution 903 is monitored by ph gauge 911 and caustic solution 903 is replaced when required via the operation of H pattern valves 904, 905, 906, 907 and pump 910. Carbon monoxide stream 491 exits neutralizing scrubber unit 9 via pipe connection 914 flowing to gas compressor 915 and (with valve 916 closed) to humidifier vessel 127 via check valve 134 and pipe connection 128.

Humidifier vessel 127 may contain water 130, may have a heating means 131, and a temperature and water level control of standard design. Carbon monoxide stream 491 may flow through water 130 in humidifier vessel 127, adding water 130 to the gas flow. The carbon monoxide and water stream 990 exits humidifier vessel 127 via pipe connection 129 and flows to reactor tube 112 via pipe connection 125. This completes the flow diagram of apparatus 100 used in this invention method.

The exemplary apparatus 100 may include multiple interconnected pieces, such as piping, valves, sensors and the like, can be constructed of carbon steel, stainless steel, Hastelloy, Monel, Inconel, Nickel, or a like material capable of operating at the temperatures and pressures contemplated herein. Apparatus 100 may be suitable for the thermo-catalytic synthesis of anhydrous hydrogen halide fluids and carbon monoxide from organic halide fluids, anhydrous hydrogen and anhydrous carbon dioxide and the thermo-catalytic synthesis of carbon dioxide from carbon monoxide and water.

Figure 2:
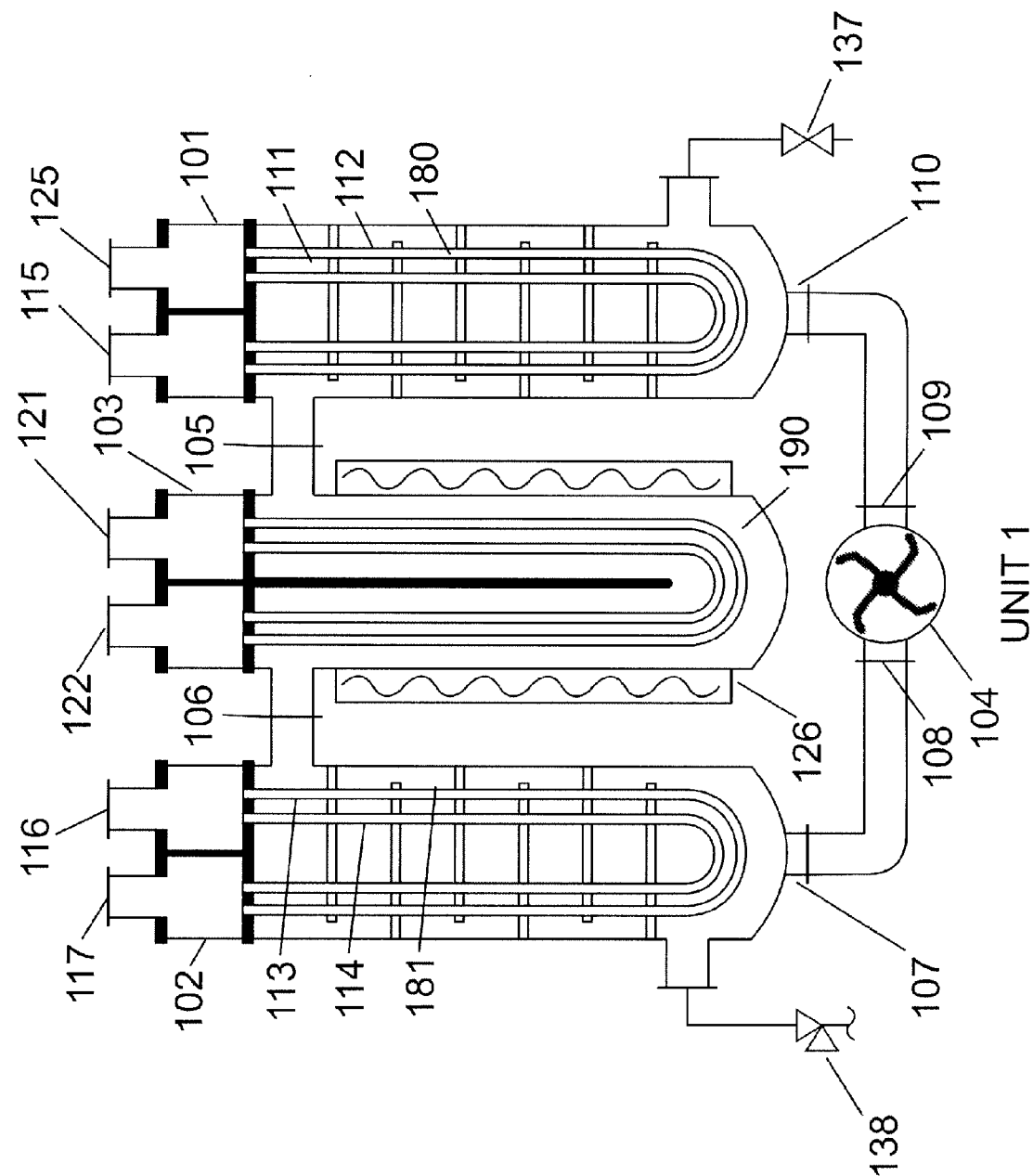
FIG. 2 is a diagram of one embodiment of a dual reactor unit 1 of the apparatus 100 utilized by the present invention.

FIG. 2 is an illustration of an exemplary dual reactor unit 1 used in this invention method. The dual reactor may include the following components: heat sink vessel 101, heat sink vessel 102, heat sink vessel 103 for balancing the heat, thermo-catalytic reactor tube 112 with reaction zone 111 containing catalyst 180 and thermo-catalytic reactor tube 114 with reaction zone 113 containing catalyst 181.

An exemplary operation of dual reactor unit 1 may be as follows: The heat transfer fluid 190 in dual reactor unit 1 is brought to the operating temperature via external heating means 126 of heat sink vessel 103. The heat transfer fluid 190 is circulated by means of bi-directional flow circulator 104 from heat sink vessel 103 via pipe connection 105 to heat sink vessel 101. From heat sink vessel 101 the heat transfer fluid 190 flows via pipe connection 110 and 109 to bi-directional flow circulator 104 continuing via pipe connections 108 and 107 to heat sink vessel 102. The heat transfer fluid 190 flows from heat sink vessel 102 via pipe connection 106 back to heat sink vessel 103. A means to balance the heat transfer fluid 190 is via inlet pipe connection 120 and outlet pipe connection 122.

Once operating temperature is reached, the process in heat sink vessel 101 may be as follows: A flow of carbon monoxide and water stream 990 enters reactor tube 112 in heat sink vessel 101 via pipe connection 125. The thermo-catalytic reaction of the carbon monoxide and water stream 990 takes place in reaction zone 111 assisted by catalyst 180. Any excess heat of reaction passes through the diathermal wall of reactor tube 112 and is absorbed by heat transfer fluid 190. The reaction forms a hydrogen and carbon dioxide stream 191, which exits reactor tube 112 via pipe connection 115.

The process in heat sink vessel 102 may be as follows: The hydrogen stream 791, carbon dioxide stream 790 and organic halide fluid stream 290 come together at pipe connection 116 and flow into reactor tube 114. The thermo-catalytic reaction of the carbon dioxide, hydrogen and organic halide fluid takes place in reaction zone 113 assisted by catalyst 181. Any excess heat of reaction passes through the diathermal wall of reactor tube 114 and is absorbed by heat transfer fluid 190.

The reaction forms anhydrous hydrogen halide and carbon monoxide stream 192, which exits reactor tube 114 via pipe connection 117.

Any impermeable metallic wall that can transfer heat through the metallic wall is a diathermal wall and is part of the diathermal wall in reactor tubes 112 and 114 of dual reactor unit 1. Any impermeable metallic wall that is in contact with the reactant is part of the reaction zones in reactor tubes 112 and 114 of dual reactor unit 1. The heat produced by the exothermic reaction of water and carbon monoxide in heat sink vessel 101 causes the temperature of the reaction zone to be increased to greater than the reaction temperature set point. The reaction zone may be maintained at a reaction zone temperature of between about 300° C. and 1000° C.

Anhydrous hydrogen fluoride collector unit 4, anhydrous hydrogen bromide collector unit 5, anhydrous hydrogen chloride collector unit 6, anhydrous carbon dioxide collector unit 7, dryer 8 and neutralizing scrubber 9 are of standard engineering design. Other operational requirements may not require any of the above or may require some of the above or may require additional components or may require any combination of the above and/or additional components.

In general, the reaction of carbon monoxide and water may be conducted at relatively low pressures. In certain embodiments, the reaction is carried out at pressures in the range of 1 atm to 30 atm, preferably at pressures in the range of 10 atm to 20 atm. In certain embodiments, the reaction is carried out at 15 atm.

In general, the reaction of the organic halide fluid, hydrogen and carbon dioxide may be conducted at relatively low pressures. In certain embodiments, the reaction is carried out at pressures in the range of 1 atm to 30 atm, preferably at pressures in the range of 10 atm to 20 atm. In certain embodiments, the reaction is carried out at 15 atm.

In certain embodiments, the flow of the anhydrous carbon dioxide and anhydrous hydrogen can be regulated depending upon the flow of the organic halide fluid being treated. For example, based upon the heat of reaction, the amount of anhydrous carbon dioxide and anhydrous hydrogen can be adjusted to operate the reactor at a level to reduce any external supply of heating or cooling.

One exemplary embodiment provides a method for utilizing dual reactors; with reactor tube 114 containing a catalyst consisting of at least two metallic elements. The elements are selected from: atomic numbers 4, 5, 13, and 14, transition metals with atomic numbers from 21 to 29. 39 to 47, 57 to 71 and 72 to 79. In the presence of these catalysts the decomposition of the organic halide fluid is completed at a decreased temperature.

An alternative embodiment provides a method for utilizing dual reactors; with reactor tube 112 containing a catalyst consisting of at least two metallic elements. The elements are selected from: atomic numbers 4, 5, 13, and 14, transition metals with atomic numbers from 21 to 29, 39 to 47, 57 to 71 and 72 to 79. In the presence of these catalysts the synthesis of hydrogen and carbon dioxide from carbon monoxide and water is obtained with the thermodynamic equilibrium being reached at lower temperatures and pressures.

A catalyst may be used to assist in the prevention of the formation of some hazardous compounds such as dioxins and furans, to accelerate the rate of reaction, decrease to the reaction temperature and/or to induce the reactions. Transition metals may be used as catalysts in either or both reactors. Exemplary metallic elements for the catalysts may be selected from the following:

| ATOMIC NUMBER | SYMBOL | NAME |
| --- | --- | --- |
| 4 | Be | Beryllium |
| 5 | B | Boron |
| 13 | Al | Aluminum |
| 14 | Si | Silicon |
| 21 | Sc | Scandium |
| 22 | Ti | Titanium |
| 23 | V | Vanadium |
| 24 | Cr | Chromium |
| 26 | Fe | Iron |
| 27 | Co | Cobalt |
| 28 | Ni | Nickel |
| 29 | Cu | Copper |
| 39 | Y | Yttrium |
| 40 | Zr | Zirconium |
| 41 | Nb | Niobium |
| 42 | Mo | Molybdenum |
| 44 | Ru | Ruthenium |
| 45 | Rh | Rhodium |
| 46 | Pd | Palladium |
| 47 | Ag | Silver |
| 60 | Nd | Neodymium |
| 66 | Dy | Dysprosium |
| 74 | W | Tungsten |
| 77 | Ir | Iridium |
| 78 | Pt | Platinum |
| 79 | Au | Gold |

In one embodiment the catalysts may be prepared by using a mixture of metallic elements in the form of alloys. Each reactor may use one or more catalysts for the reaction. In the reactor for the synthesis of carbon dioxide and hydrogen the thermo-catalytic reaction of carbon monoxide and water (the water-gas shift reaction) may be enhanced by using a catalyst having two or more of the following elements: Al, Ni, Fe, Co, Pt, Ir, Cr, Mo, Cu, Pd, Rh, V and Au as the principal components of the alloy. In the reactor for the decomposition of organic halides, such as refrigerants and perfluorocarbon fluids, the thermo-catalytic reaction may be enhanced by using a catalyst having a blend of the following elements: Nd, Nb, Dy, Fe, B, Pt, Pd, Rh, Y, Co, Ni, Cr, Mo, Al, Ir and W as the principal components of the alloy.

The physical form of each of the alloys used in the blend can be produced in a variety of shapes, such as pellets, cylinders or flat sheets, with a preferable range of 0.5 mm to 5.0 mm in thickness, a preferable range of 10 $mm^2$ to 100 $mm^2$ in surface area per unit and a specific surface area in $cm^2/g$. The alloys are very compact metallic materials with less porosity than catalyst oxide supports, where the typical specific surface area is measured in $m^2/g$. In general the specific surface area for alloy is measured in $cm^2/g$.

The majority of catalyst supports are mineral oxides and all mineral oxides react with hydrogen halides. Therefore, mineral oxide catalyst supports are not used in this invention. As an alternative, this invention may use sintered metallic alloy catalyst supports. Sintered metallic alloy catalysts and catalyst supports are resistant to corrosion by the hydrogen halide and high temperatures. Flat sheet particles of metallic alloys with a thickness of 0.5 mm to 5.0 mm, a unit surface area from 10 $mm^2$ to 100 $mm^2$ and a range of the specific surface area from 20 $cm^2/g$ to 80 $cm^2/g$ are used in the experimental unit however, a unit for an industrial plant would likely use a specific surface area in the range of 10 to 200 $m^2/g$.

The catalysts prepared for the experimental work of this invention were selected from alloys as follows:

Catalyst #1 consists of the elements Fe 50.0% wt, Ni 33.5% wt, Al 14.0% wt, Co 0.5% wt, Ti 0.5% wt, Si 1.125% wt and Rh/Pt 0.5% wt in an alloy form. True density of the alloys is in a range from 2.0 $g/cm^3$ to 10 $g/cm^3$ and the bulk density of the catalysts particles of the alloy is in a range from 0.25 to 0.5 g/cc.

Catalyst #2 consists of the elements Fe 63.0% wt, CR 18% wt, Mo 3% wt, Mn 2.0% wt, and Si 0.08% wt in an alloy form. True density of the alloy is in a range from 2.0 to 10 g/cm$^3$ and the bulk density of the catalysts is in a range from 0.25 to 0.5 g/cc. Other catalysts equivalent to alloy #2 is Hastelloy C, Inconel 600 and Stainless Steel 316

Catalyst #3 consists of the elements Fe 65.0% wt, Nd 29% wt, Dy 3.6% wt, Nb 0.5% wt, B 1.1% wt and Ir/Pt 0.08% wt in an alloy form. True density of the alloy is in a range from 2.0 to 10 g/cm$^3$ and the bulk density of the catalysts is in a range from 0.25 to 0.5 g/cc.

Catalyst #4 consists of the elements Pd 82.0% wt, Cu 17% wt and Pt/Rh 1.0% wt in an alloy form. True density of the alloy is in a range from 2.0 to 10 g/cm$^3$ and the bulk density of the catalysts is in a range from 0.25 to 0.5 g/cc.

The catalyst for the synthesis of anhydrous hydrogen halides, from the thermo-catalytic reaction of organic halides, hydrogen and carbon dioxide, is a blend of about 50% of alloy #2 and 50% of alloy #3.

A laboratory bench scale unit was set up for conditioning the catalysts of this invention and the results obtained from the subsequent test runs were at a maximum pressure of 4 atm. The tests were (1) the reaction of carbon monoxide and water and (2) the reaction of organic halide with carbon dioxide and hydrogen; with a comparison being made between the use of no catalyst or improvements over other catalysts. Four stainless steel 316 reactor tubes were prepared, each having dimensions of 19 mm OD, 16 mm ID and 900 mm (90 cm) in length. Each tube has a cross sectional flow area of 200 mm$^2$, an internal wall surface of 45,000 mm$^2$ and an internal volume of about 180,000 mm$^3$ (180 cm$^3$).

In reactor tube #1, a stainless steel 316 sintered filter, having a 15 mm OD and 75 mm length, was inserted in one end. A 75 g blend of catalyst #1 and catalyst #2 was then added to reactor tube #1, followed by another stainless steel 316 sintered filter, having a 15 mm OD and 75 mm length, being inserted in the other end of reactor tube #1. The prepared reactor tube #1 was set in a high temperature heating oven and a passivation procedure was initiated. The passivation process was to flow 20 ml/minute of hydrogen fluoride for three hours at 1000° C. to form a layer of metal fluoride in the active surface area of the catalyst. This was followed by a flow of 20 cc/minute of carbon dioxide for one hour at 900° C. and for one hour with the heater turned off. At this point, the flow of carbon dioxide was stopped and the reactor tube was opened to the atmosphere.

Reactor tube #2 is identical in construction and preparation to reactor tube #1, however the catalyst was changed by substituting a 75 g blend of catalyst #2 and catalyst #3. The passivation procedure was identical to reactor tube #1.

Reactor tube #3 is identical in construction to reactor tube #1, however it contained no filters or catalyst; i.e. an empty tube. There was no passivation procedure used with reactor tube #3.

Reactor tube #4 is identical in construction and preparation to reactor tube #1, however the catalyst was changed by substituting 75 g of catalyst #4. There was no passivation procedure used with reactor tube #4.

In another aspect, the method may utilize an apparatus arrangement of a battery of dual reactors wherein energy input is not required.

EXAMPLES

The following reactions represent typical exothermic and endothermic reactions in which various illustrative organic halide fluids are thermo-catalytically formed into anhydrous hydrogen halide and carbon monoxide. The examples show the exothermic reactions having a higher energy value than the endothermic reactions with the benefit that the excess of energy of the exothermic reaction balances the heat sensible of the reactant component. Following is the heat of formation and heat capacity table used for the examples:

| Symbol | Heat of Formation Kcal/mol $\Delta Hf$ 25° C. | Heat Capacity Cal/mol ° C. @ constant pressure@ 500° C. average |
|---|---|---|
| $CF_4$ | −220.5 | 14.56 |
| $CCl_2F_2$ | −114.2 | 17.54 |
| $CHClF_2$ | −113.0 | 13.28 |
| $C_2H_2F4$ | 206.7 | 34.57 |
| CO | −26.4 | 7.21 |
| $CO_2$ | −94.0 | 10.77 |
| $H_2$ | 0.0 | 7.00 |
| H2O | −58.0 | 8.54 |
| HF | −64.0 | 6.94 |
| HCl | −22.0 | 7.06 |

Example 1

Reactor tube #4 was heated to a temperature of 850° C. The CO flow meter was set for a 22 cc/minute flow through a water humidifier, where the CO joined with 18 mg/minute of $H_2O$. The CO and $H_2O$ were flowed into the reaction zone contacting the catalyst blend and the reaction of the CO and H2O formed $CO_2$ and $H_2$. During the nine minutes of collection, 390 cc of gaseous product with a cylinder pressure of 10 psig was collected in a sample cylinder having a 234 cc empty volume. The gaseous product was analyzed by a gas chromatograph with the only compounds detected being CO at 50% by mol, CO2 at 25% by mol and $H_2$ at 25% by mol.

$CO + H_2O \rightarrow CO_2 + H_2 + \Delta HR$ $-26.00 - 58.00 \rightarrow -94.00 + 0.00$ $\Delta H_r = -84.00 \ \Delta H_p = -94.00$ $\Delta H_{R\ 25°\ C.} = \Delta H_p - \Delta Hr = -94.00 + 84.00 = -10\ Kcal/mol$ $CP_r = +7.21 + 8.54 = +15.75\ Cal/mol \times degrees\ C.$ $CP_p = +10.77 + 7.00 = +17.77\ Cal/mol \times degrees\ C.$

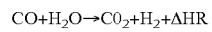
$\Delta CP = CP_p - CP_r = (17.75 - 15.75) = 2 \times 800 = 1600 = 1.6$ Kcal/mol $\Delta H_{R\ 800°\ C.} = -10.00\ Kcal/mol + 1.60 = -8.40\ Kcal/mol$ Exothermic Reaction Example 2

Reactor tube #1 was heated to a temperature of 850° C. Three flow meters were calibrated for (1) carbon tetrafluoride at 22 cc/minute, (2) carbon dioxide at 22 cc/minute and (3) hydrogen at 44 cc/minute. The exhaust was checked with an electronic organic halide detector and no carbon tetrafluoride was detected. The product was collected for eight minutes into a sample cylinder at a pressure of 29 psig with the product being liquid anhydrous hydrogen fluoride. Partial pressure of anhydrous hydrogen fluoride was 22 psia and partial pressure of the carbon monoxide was 22 psia; the total pressure was 44 psia=29 psig.

| GC-MS Analysis | | FTIR Analysis | |
|---|---|---|---|
| CF4 | ND | HF (anhydrous vapor/liquid)/CO | 2/1 |
| Dioxins | ND | | |
| Furans | ND | | |
| Hydrogen | <1% | | |
| Carbon dioxide | <5% | | |

$CF_4 + 2H_2 + CO_2 + \rightarrow 2CO + 4HF + \Delta H_R$ $-220.50 + 0.00 - 94.00 \rightarrow -26.40 - 64.00$ $\Delta H_r = -220.50 - 94.00 = 314.5$ $\Delta H_p = -2(26.40) - 4 \times 64.00 = -308.8$ $\Delta H_{R\,25°\,C} = -308.8 + 314.50 = +5.700\ Kcal/mol$ $CP_r = +14.56 + 2(7.00) + 10.77 = +39.33\ Cal/mol \times$ degrees C.

$CP_p = +2(7.21) + 4(6.94) = +42.18\ Cal/mol \times degrees\ C.$ $\Delta CP = 2.85 \times 800 = +2.28\ Kcal/mol$ $\Delta H_{R\,800°\,C} = +5.70 + 2.28 = +7.98\ Kcal/mol$ Endothermic Reaction

Example 3

Reactor tube #1 was heated to a temperature of 850° C. Three flow meters were calibrated for (1) dichlorodifluoromethane at 22 cc/minute, (2) carbon dioxide at 22 cc/minute and (3) hydrogen at 44 cc/minute. The exhaust was checked with an electronic organic halide detector and no dichlorodifluoromethane was detected. The product was collected for eight minutes into a sample cylinder at a pressure of 54 psi+/−1 psi with the product being liquid anhydrous hydrogen fluoride and liquid anhydrous hydrogen chloride.

| GC-MS Analysis | |
|---|---|
| Dichlorodifluoromethane (R-12) | ND |
| Dioxins | ND |
| Furans | ND |
| Hydrogen | <2% |
| Carbon dioxide | <6% |
| Carbon monoxide | 31% |
| Hydrogen fluoride | 31% |
| Hydrogen chloride | 31% |

$CClF_2 + 2H_2 + CO_2 + \rightarrow 2CO + 2HF + 2HCl + \Delta H_R$ $-114.20 + 0.00 - 94.00 \rightarrow -26.40 - 64.00 - 22.00$ $\Delta H_r = -114.20 - 94.00 = -208.20$ $\Delta H_p = -2(112.40) = -224.8$ $\Delta H_{R\,25°\,C} = -224.8 + 208.20 = -16.60\ Kcal/mol$ $CP_r = +17.54 + 14.0 + 10.77 = +42.31\ Cal/mol \times degrees\ C.$ $CP_p = +2(7.21 + 7.06 + 6.94) = +42.4\ Cal/mol \times degrees\ C.$ $\Delta CP = (42.42 - 42.31) \times 800 = +0.00\ Kcal/mol$ $\Delta H_{R\,800°\,C} = -16.60\ Kcal/mol$ Exothermic Reaction

Example 4

Reactor tube #2 was heated to a temperature of 850° C. Three flow meters were calibrated for (1) chlorodifluoromethane at 22 cc/minute, (2) carbon dioxide at 22 cc/minute and (3) hydrogen at 22 cc/minute. The exhaust was checked with an electronic organic halide detector and no chlorodifluoromethane was detected. The product was collected for eight minutes into a sample cylinder at a pressure of 53 psi+/−1 psi with the product being liquid anhydrous hydrogen fluoride and liquid anhydrous hydrogen chloride.

| GC-MS Analysis | |
|---|---|
| Chlorodifluoromethane (R-22) | ND |
| Dioxins | ND |
| Furans | ND |
| Hydrogen | <1% |
| Carbon dioxide | <4% |
| Carbon monoxide | 38% |
| Hydrogen fluoride | 40% |
| Hydrogen chloride | 20% |

$CHCl_2F_2 + H_2 + CO_2 + \rightarrow 2CO + 2HF + HCl + \Delta H_R$ $-113.00 + 0.00 - 94.00 \rightarrow -26.40 - 64.00 - 22.00$ $\Delta H_r = -113.00 - 94.00 = -207.00$ $\Delta H_p = -2(26.40) - 2(64.00) - 22 = -202.8$ $\Delta H_{R\,25°\,C} = -202.8 + 207.20 = +4.20\ Kcal/mol$ $CP_r = +13.28 + 10.77 + 7.0 = +31.05\ Cal/mol \times degrees\ C.$ $CP_p = +2(7.21) + 2(6.94) + 7.06 = +35.36\ Cal/mol \times$ degrees C.

$\Delta CP = 35.36 - 31.05 = 4.31 \times 800 = 3,438.00\ Cal/mol$ $\Delta CP = 3,438.00\ Cal/mol/1000 = 3.44\ Kcal/mol$ $\Delta H_{R\,800°\,C} = +4.20 + 3.45 = +7.65\ Kcal/mol$ Endothermic Reaction

Example 5

Reactor tube #2 was heated to a temperature of 850° C. Three flow meters were calibrated for (1) tetrafluoroethane at 22 cc/minute, (2) carbon dioxide at 44 cc/minute and (3) hydrogen at 22 cc/minute. The exhaust was checked with an electronic organic halide detector and no tetrafluoroethane was detected. The product was collected for eight minutes into a sample cylinder at a pressure of 64 psi+/−2 psi with the product being liquid anhydrous hydrogen fluoride.

| GC-MS Analysis | |
|---|---|
| Tetrafluoroethane (R-134a) | ND |
| Dioxins | ND |
| Furans | ND |
| Hydrogen | <2% |
| Carbon dioxide | <4% |
| Carbon monoxide | 48% |
| Hydrogen fluoride | 48% |

$C_2H_2F_4+H_2+2CO_2+ \rightarrow 4CO+4HF+\Delta H_R$ $-206.70+0.00-94.00 \rightarrow -26.40-64.00$ $\Delta H_r = -(206.70+188.00) = -394.70$ $\Delta H_p = -4(90.40) - 2(64.00) = -361.60$ $\Delta H_{R\ 25°\ C} = -361.60+394.70 = +33.00\ Kcal/mol$ $CP_r = -(34.57+21.54+7.0) = -63.11\ Cal/mol \times degrees\ C.$ $CP_p = +4(7.21)+4(6.94) = +56.60\ Cal/mol \times degrees\ C.$ $\Delta CP = -63.11 - +56.60 = -6.51 \times 800 = -5,208.00\ Kcal/mol$ $\Delta CP = -5,208.00/1000 = -5.21\ Kcal/mol$ $\Delta H_{R\ 800°\ C} = +33.00-5.20 = 27.80\ Kcal/mol$ Endothermic Reaction

Example 6

Reactor tube #3, with no catalyst present, was heated to a temperature of 850° C. Three flow meters were calibrated for (1) carbon tetrafluoride at 22 cc/minute, (2) carbon dioxide at 22 cc/minute and (3) hydrogen at 44 cc/minute. The exhaust was checked with an electronic organic halide detector and carbon tetrafluoride was detected. The temperature was increased to 950° C., the exhaust was checked with the electronic organic halide detector and carbon tetrafluoride was detected. The temperature was increased to 1050° C., the exhaust was checked with the electronic organic halide detector and carbon tetrafluoride was detected. The temperature was increased to 1150° C., the exhaust was checked with the electronic organic halide detector and no carbon tetrafluoride was detected. Example 6 proves that the catalyst of this invention decreases the temperature required for the complete decomposition of the perfluorocarbon (carbon tetrafluoride) by about 300° C.

Conclusions from the results of the examples are: (1) The excess of hydrogen and carbon dioxide in the reaction of the decomposition of organic halides, such as CFCs, HCFCs, FCs and HFCs does not affect the reaction and is beneficial in preventing the generation of soot, (2) the excess of water in the reaction of carbon monoxide with water in the water-gas shift reaction does not create any negative effect, (3) the exclusion of molecular oxygen in the process prevents the formation of unwanted compounds especially when chloride or chlorine is present in the reaction zone and (4) the catalysts of the invention decreases the temperature required for the complete decomposition of the organic halide by about 300° C.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. A method for the synthesis of anhydrous hydrogen halide and carbon dioxide comprising: reacting one or more organic halides with anhydrous hydrogen and anhydrous carbon dioxide to produce anhydrous carbon monoxide and one or more anhydrous hydrogen halides; and
   reacting the carbon monoxide with water to produce hydrogen and carbon dioxide.

2. The method of claim 1, wherein reacting carbon monoxide with water is performed in a first reactor and reacting the organic halide with hydrogen and carbon dioxide is performed in a second reactor.

3. The method of claim 1, wherein reacting the one or more organic halides with anhydrous hydrogen and anhydrous carbon dioxide is performed in an environment free of molecular oxygen and with carbon dioxide as the sole oxidizer.

4. The method of claim 1, further comprising:
   using a catalyst for the reaction of the one or more organic halides with anhydrous hydrogen and anhydrous carbon dioxide;
   adding water to the anhydrous carbon monoxide by flowing the anhydrous carbon monoxide through a humidifier prior to reacting the carbon monoxide with water; and
   using a catalyst for the reaction of the carbon monoxide and water.

5. The method of claim 1, further comprising flowing the hydrogen and carbon dioxide produced from the reaction of the carbon monoxide and water through a dryer to obtain anhydrous hydrogen and anhydrous carbon dioxide.

6. The method of claim 5, further comprising using the anhydrous hydrogen and anhydrous carbon dioxide from the dryer as reactants in the step of reacting one or more organic halides with anhydrous hydrogen and anhydrous carbon dioxide to produce anhydrous carbon monoxide and one or more anhydrous hydrogen halides.

7. The method of claim 5, further comprising separating the anhydrous hydrogen from the anhydrous carbon dioxide and flowing the separated anhydrous hydrogen through a diffuser to produce pure hydrogen.

8. The method of claim 7, wherein the separation of anhydrous hydrogen from anhydrous carbon dioxide is performed using a collector unit.

9. The method of claim 8, further comprising contacting the anhydrous hydrogen from the diffuser with the anhydrous carbon dioxide from the collector unit and with the one or more organic halides for the step of reacting one or more organic halides with anhydrous hydrogen and anhydrous carbon dioxide to produce anhydrous carbon monoxide and one or more anhydrous hydrogen halides.

10. The method of claim 1, further comprising flowing through a diffuser membrane the hydrogen produced from reacting water with carbon monoxide.

11. The method of claim 10, further comprising contacting the hydrogen that does not flow through the diffuser membrane with the carbon monoxide and water when reacting the carbon monoxide with water to produce hydrogen and carbon dioxide.

12. The method of claim 1, wherein reacting the carbon monoxide with water to produce hydrogen and carbon dioxide is performed at a temperature range of 300° C. to 1000° C. and a pressure range of 1 to 30 atm.

13. The method of claim 1, further comprising:
separating the hydrogen and carbon dioxide using a first collector unit where the carbon dioxide is collected; and
separating the anhydrous hydrogen halides using a series of second collector units, wherein the series of second collector units comprises one or more collector units, each collector unit used to collect a type of hydrogen halide.

14. The method of claim 13, further comprising:
flowing the hydrogen and carbon dioxide through a dryer to produce anhydrous hydrogen and anhydrous carbon dioxide prior to separating the hydrogen from the carbon dioxide; and
after separating the hydrogen from the carbon dioxide, flowing the anhydrous hydrogen, along with a trace of other impurities, to a hydrogen diffuser.

15. The method of claim 13, wherein the one or more anhydrous hydrogen halides comprise one or more selected from the group consisting of anhydrous hydrogen fluoride, anhydrous hydrogen bromide, and anhydrous hydrogen chloride; and
wherein the series of second collector units comprises a collector unit for each type of anhydrous hydrogen halide included in the one or more anhydrous hydrogen halides.

16. The method of claim 1, further comprising neutralizing the one or more anhydrous hydrogen halides by flowing the one or more anhydrous hydrogen halides through a caustic solution.

17. The method of claim 1, further comprising:
carrying out both reacting steps in a dual reactor unit comprising a first thermo-catalytic reactor tube and a second thermo-catalytic reactor tube, wherein the carbon monoxide is produced in the second thermo-catalytic reactor tube, and wherein the carbon dioxide and hydrogen are produced in the first thermo-catalytic reactor tube;
recycling the carbon monoxide produced in the second thermo-catalytic reactor tube to the first thermo-catalytic reactor tube as a reactant for the production of the carbon dioxide and hydrogen; and
recycling at least part of the carbon dioxide and hydrogen from the first thermo-catalytic reactor tube to the second thermo-catalytic reactor tube to react with the one or more organic halides.

18. A method for the treatment and/or decomposition of organic halide fluids without harmful environmental emissions comprising:
reacting in a reactor B one or more organic halides, anhydrous hydrogen, and anhydrous carbon dioxide to produce carbon monoxide and one or more anhydrous hydrogen halides;
collecting at least part of the anhydrous hydrogen halides;
flowing the carbon monoxide to a reactor A;
reacting the carbon monoxide in reactor A with water to produce hydrogen and carbon dioxide;
removing the water from the hydrogen and carbon dioxide to produce anhydrous hydrogen and anhydrous carbon dioxide;
recycling the anhydrous hydrogen and anhydrous carbon dioxide to reactor B.

19. The method of claim 18, further comprising collecting at least some of the anhydrous carbon dioxide prior to recycling the anhydrous carbon dioxide to the first reactor.

* * * * *